Jan. 20, 1959  C. R. BUSCH  2,869,688
RAILWAY BRAKE DISCS
Filed Oct. 4, 1955  2 Sheets-Sheet 1
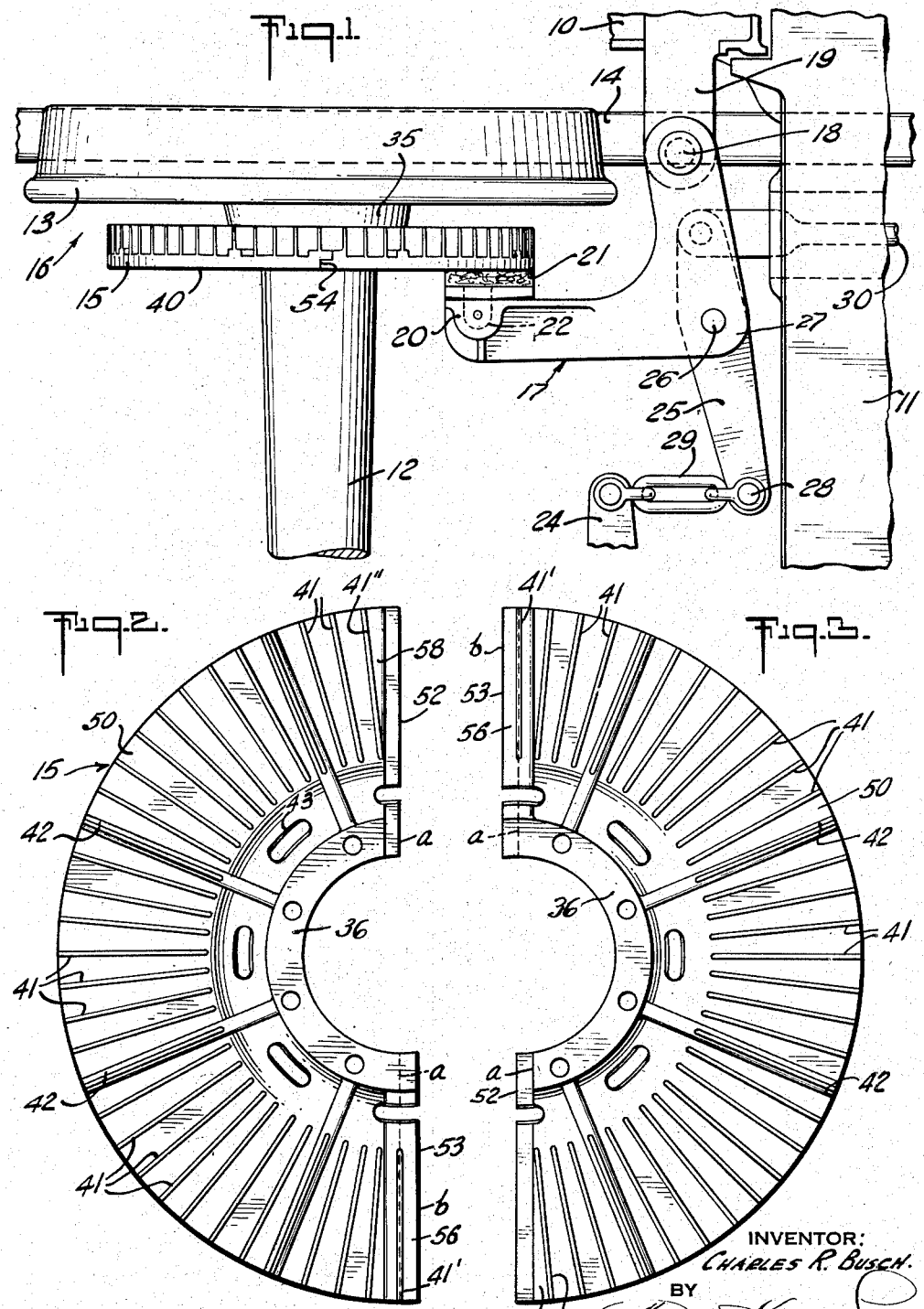
INVENTOR:
CHARLES R. BUSCH.
BY
ATTORNEYS.

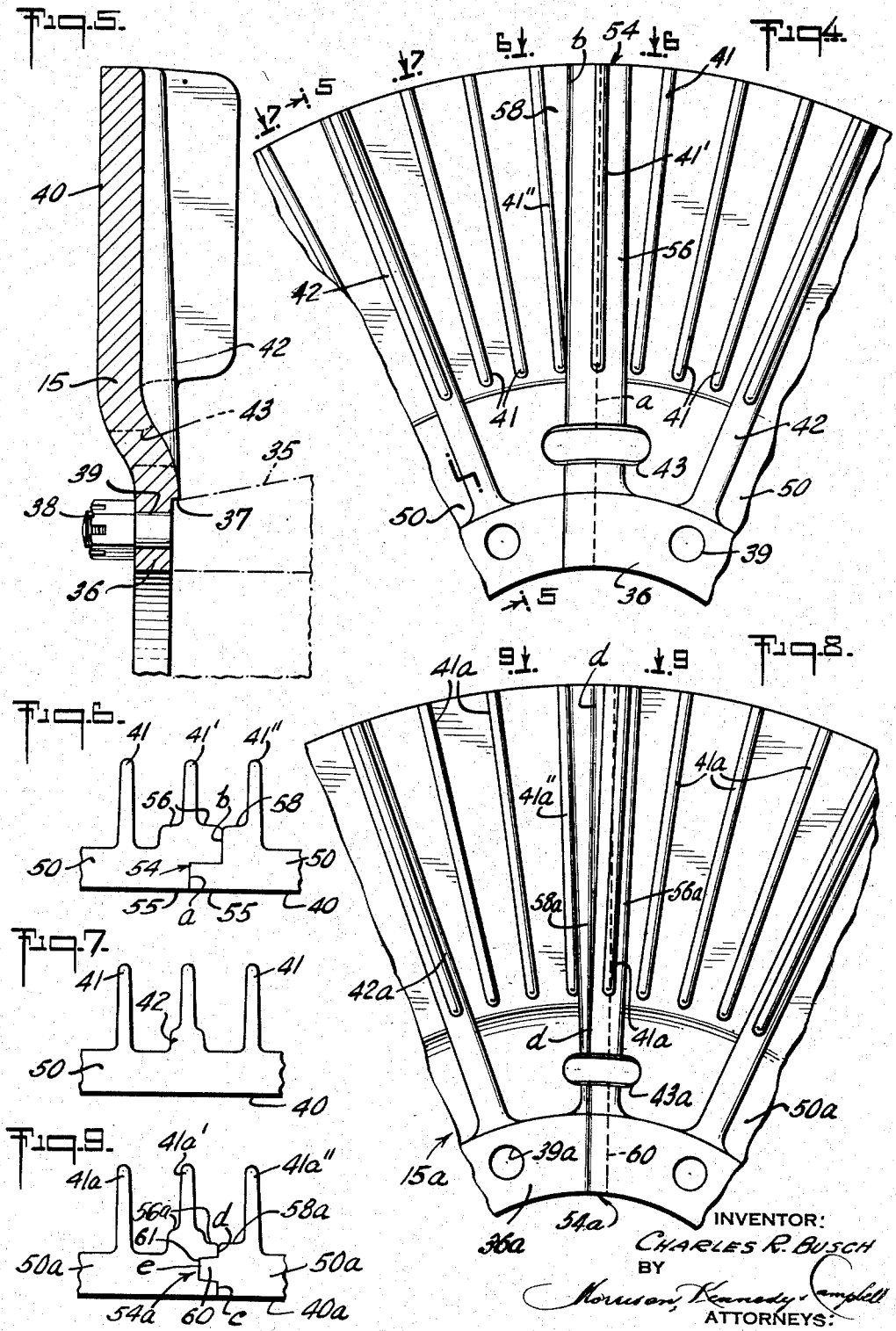

United States Patent Office 2,869,688
Patented Jan. 20, 1959

2,869,688

RAILWAY BRAKE DISCS

Charles R. Busch, Orange, N. J., assignor to Buffalo Brake Beam Company, a corporation of New York Application October 4, 1955, Serial No. 538,407

6 Claims. (Cl. 188—218)

The present invention relates to disc brakes for railway car wheels.

The conventional railway freight car has two trucks, each with side frames and four wheels arranged into two sets of coaxial wheels on two axles supported on said side frames. In one rotor brake disc type of brake mechanism for these wheels, as for example, in the type described in my copending application Serial No. 491,838, filed March 3, 1955, the brake shoes are applied for braking action against the faces of friction discs rotatable with respective wheels.

Derailments of freight cars, aside from those causing wrecks are common occurrences, due for example, to delivery of cars to plants where sharp curves are encountered, to the entry of the cars on loading tracks, to stuck couplers, to fouling center plates, etc. The cars so commonly derailed are very easily rerailed and continued on in service without any damage, but should a car be equipped with disc brakes of the general type referred to, the friction discs might strike the rail during such derailments, and either break, become distorted or be otherwise damaged.

Where the friction disc is of one piece and separable from the wheel, such a disc is so mounted on the wheel axle, that it cannot be removed therefrom without a major disassembly operation requiring the removal of the truck from under the car and the removal of the axle from its support on the side frames of the truck.

One object of the present invention is to provide a new and improved friction brake disc, which is so constructed that it can be disassembled from a truck in an easy economical manner, without removing the truck from the car or removing the wheel carrying the brake disc from the truck.

In carrying out certain features of the present invention, the friction brake disc comprises a series of separate complemental sections, adapted to be fitted and jointed together on an axle to form conjointly a single brake disc unit. In this manner, replacement of any brake disc or damaged section of the brake disc can be effected easily and economically, without removal of the truck or disassembly of the axle or wheel therefrom.

Various other objects, features and advantages of the present invention are apparent from the following particular description and from the accompanying drawings, in which Fig. 1 is a top plan view of a part of a railway freight car truck, showing a brake mechanism with a friction brake disc embodying the present invention;

Fig. 2 is a rear face view of one section of the friction brake disc embodying the present invention;

Fig. 3 is a rear face view of the other section of the friction brake disc embodying the present invention;

Fig. 4 is a detail rear view of the friction brake disc taken along a joint between the sections thereof;

Fig. 5 is a detail section of the friction brake disc taken along the lines 5—5 of Fig. 4;

Fig. 6 is a detail edge view of the friction brake disc taken in front of the joint along the lines 6—6 of Fig. 4;

Fig. 7 is a detail edge view of the friction brake disc taken along the lines 7—7 of Fig. 4;

Fig. 8 is a detail rear view of a friction brake disc embodying the present invention and having a modified form of joint between the sections thereof; and Fig. 9 is a detail edge view of the friction brake disc of Fig. 8, taken in front of the joint along the lines 9—9 of Fig. 8.

Referring to Figs. 1 to 7 of the drawings, and especially to Fig. 1, the friction brake disc of the present invention is shown applied to a railway freight car truck, comprising a pair of side frames 10, a truck bolster 11 on which the car body (not shown) is mounted, extending between said side frames and spring-supported thereon, and a pair of parallel axles 12 (only one being shown) extending between the side frames and journalled in said side frames, each said axles carrying a pair of car wheels 13 on its opposite ends for riding engagement with rails 14 (only one being shown). The car truck described is of conventional well-known construction and is more fully described and shown in the aforesaid copending application.

Secured to each wheel 13 on its inboard side is a friction disc 15 forming with said wheel a coaxial wheel and brake disc unit 16 and constituting part of a disc brake device to be described. The braking mechanism per se, for applying braking shoes to the friction brake discs 15, is the subject-matter of the aforesaid application. This braking mechanism for each car truck comprises four L-shaped brake head levers 17 (only one being shown), arranged two on one side of the bolster 11 for the two coaxial wheel and brake disc units 16 on this side of the bolster and two on the other side of the bolster for the other two coaxial wheel and brake disc units. Each of these brake head levers 17 is pivotally secured at one end 18 to a bracket 19 rigidly affixed to a corresponding side frame and projecting laterally therefrom. The other end of the brake head lever 17 has a brake head 20 carrying a segmental brake shoe 21. Each brake head lever 17 is thereby supported to move substantially in a horizontal plane about its pivot support at 18 into braking position to apply the brake shoe 21 to the friction face on the brake disc 15 and out of braking position, and the brake shoe has a yieldable connection 22 with the brake head, allowing said brake head to rock and thereby to align the brake shoe automatically into continuous face braking contact with the braking face of the disc, upon the application of the brake.

Power is applied to the four brake head levers 17 simultaneously through a bridle beam 24 extending on one side of the bolster 11 horizontally across the center line of the car truck with its middle region substantially on said center line. The intermediate section of the beam 24 is supported from the car body by a lever (not shown) power actuated by a pull rod (not shown) from a source of power, as for example, an air cylinder (not shown). Power is transmitted from the bridle beam 24 simultaneously to the two brake head levers 17 on one side of the bolster 11 by means of brake arms 25 (only one being shown), each pivotally supported at 26 to the elbow 27 of the corresponding brake head lever and having a pivotal connection at one end 28 with the corresponding end of the bridle beam 24 through a flexible connection 29. For transmitting power from the brake arms 25 on one side of the bolster 11 to the brake head levers 17 on the opposite side, there are provided two brake arms (not shown) pivoted intermediate their ends to the elbows of the respective brake head levers on said opposite side of the bolster and fulcrumed at one end to brackets (not shown) affixed to the side of the bolster. The latter brake arms so fulcrumed, are operated from the brake arms 25 by push rods 30 (only one being shown), each passing through the bolster 11 and pivotally connected at its ends to a pair of said brake arms on opposite sides of the bolster. For a more complete disclosure of the braking mechanism described, reference is made to the aforesaid copending application.

The wheel and brake disc unit 16 comprises the car wheel 13 and the friction brake disc 15 coaxial therewith and disposed on the inner or inboard side of the wheel, as already described. The car wheel 13 comprises a hub 35 embracing the corresponding axle 12 and keyed, pressed and/or otherwise affixed thereto for rotation therewith in any suitable manner. The brake disc 15 has a hub 36 embracing the corresponding axle with a press-fit or with merely a snug fit and provided on its outboard side with a recess 37 to receive snugly therein the inboard end of the wheel hub 35. The brake disc 15 is rigidly and removably secured to the wheel 13 for rotation therewith by means of studs 38 passing through holes 39 in the brake disc hub 36 and threaded into the wheel hub 35.

The brake disc 15 which is the subject of the present invention may be made as a casting, forging, pressing or the like and consists of a circular disc presenting on its inboard side a flat circular friction brake surface 40 against which the braking shoe 21 is applied for braking action. On its outboard side, the brake disc 15 has integral therewith a series of fins 41, 41' and 41" opposite the braking surface 40, extending radially from the outer circular edge of the disc to a region short of the disc hub 36 to dissipate the heat generated on the disc from the brake shoe. The outboard side of the brake disc 15 also has a series of reinforcing ribs 42 extending radially from the outer circular edge of the brake disc 15 to the disc hub 36. A series of holes 43 in the brake disc 15 to lighten the construction and provide means for promoting ventilation therethrough into the annular space between the brake disc and the corresponding wheel 13.

As a feature of the present invention, the brake disc 15 is of sectionalized construction to permit the easy removal of the disc from the corresponding axle 12 and its replacement thereon, without the need of disassembling the car truck. For that purpose, the brake disc 15 comprises a plurality of complemental substantially sectoral sections 50, the disc in the specific form shown being illustrated as constituting two of such sections, each encompassing an angle of about 180° and each formed on its two substantially radial edges with joint conformations 52 and 53 respectively adapted to fit and mate with joint conformations 53 and 52 respectively on the substantially radial edges of the other disc section, to form close substantially radial joints 54 therebetween. In the form of the invention shown in Figs. 1 to 7, these radial joints 54 are in the form of ship-lap or rabbet joints, and for that purpose, the substantially radial edges of the disc sections 50 are partly cut away or recessed, so that the faces of these disc sections on opposite sides of the joints are flush. The joints 54 are formed, so that the juncture plane a of each joint on the inboard side of the brake disc 15 extends radially along the center plane of the end heat radiating fin 41' of one disc section 50, the juncture plane b of said joint on the outboard side of the brake disc is parallel to the radial juncture plane a, to assure a joint of uniform width throughout its length and the inboard faces 55 of the two disc sections 50 along each junction plane a are flush with the flat friction brake surface 40 of the disc.

To afford substantial thickness of the brake disc 15, at least along the major part of each joint 54, each of the disc sections 50 along one substantially radial edge thereof is provided on its outboard side with a ridge 56 of substantially rectangular form along the base of the end fin 41' centered with respect thereto and extending to or close to the hub 36 of the disc, and along the other substantially radial edge thereof is provided with a substantially sector-shape ridge 58 along the base of the end fin 41", at least along one side thereof, the two ridges 56 and 58 between the two adjoining fins 41' and 41" of the two disc sections 50 on opposite sides of the juncture plane b being flush. The resulting joint 54 is a thick solid one, at least along the lengths of the heat radiating fins 41' and 41", as a result of these ridges 56 and 58.

The two disc sections 50 are exact duplicates and therefore interchangeable, and the replacement of either one of these sections is an easy matter, involving no disassembly of the car truck or even the removal of the car truck from the car body.

Figs. 8 and 9 show a modified construction, in which the joints between the complemental sections of the brake disc are of the tongue and groove type. In this modified construction, the friction brake disc 15a has a hub 36a with holes 39a for removably mounting the disc on the hub 35 of the car wheel 13, a friction brake face 40a on the inboard side, a series of heat radiating fins 41a, 41a' and 41a" on the outboard side, reinforcing ribs 42a also on the inboard side, and a series of ventilating holes 43a. This brake disc 15a comprises two complemental duplicate sections 50a, each encompassing an angle of approximately 180° and both joined together edge to edge by substantially radial tongue and groove joints 54a. For that purpose, one substantially radial edge of each disc section 50a has a tongue or rib 60 projecting edgewise therefrom and the other substantially radial edge of this disc section has a groove 61 into which the tongue 60 of the other disc section is adapted to extend with a snug fit. The two disc sections 50a come together along radial coextensive edge planes c and d, and along the faces of the tongue and groove formation 60 and 61, the inboard faces of the disc sections on opposite sides of the junction plane c are flush with each other and with the friction brake surface 40a of the disc 15a and the width of the tongue 60 is substantially uniform, so that its edge e extends parallel to the junction planes c and d. To afford substantial thickness along the joints 54a, the end fins 41a' have respective ridges 56a at the bases thereof extending to or close to the hub 36a of the disc 15a, and the end fins 41a" have substantially sector-shaped respective ridges 58a along the bases thereof, or at least along one side thereof, extending to the hub 36a. The two ridges 56a and 58a between the two adjoining fins 41a' and 41a" of the two disc sections 50a on opposite sides of the juncture planes c and d are therefore flush and the resulting joint 54a will be a thick solid one.

As far as certain aspects of the invention are concerned, other forms of joints may be provided between the two disc sections and the brake disc may be divided into any number of sections jointed together edge to edge into an operative unit.

While the invention has been described with particular reference to specific embodiments, it is to be understood that it is not to be limited thereto, but is to be construed broadly and restricted solely by the scope of the appended claims.

What is claimed is:

1. A brake disc for a car wheel of a railway car truck, said brake disc having a central hole permitting a wheel axle to pass therethrough and having a hub by which the disc may be removably mounted for rotation with the car wheel with one face of the disc confronting the car wheel and with the part of said disc radially outwardly beyond the hub of said disc axially spaced from the car wheel, said disc comprising a series of complemental, duplicate and interchangeable sections joined and removably secured together into a single disc unit, said disc sections being substantially in the form of sectors with substantially radial edges, said sections being joined together edge to edge and conjointly presenting on the other face of the disc a continuous flat annular friction brake surface, the adjoining portions along each joint overlapping across the regions of said friction brake surface to cause one of the sections along each joint to support the other adjoining section along the latter joint against braking pressure applied to said brake surface, said disc being free from any means of support or any means of interconnecting the sections of the disc except that provided by its hub when mounted for rotation with the car wheel and that provided by the overlapping portions of the disc sections along their joints.

2. A brake disc as described in claim 1, comprising radial ridges on the face of the disc confronting the car wheel in mounted position of said disc, said ridges extending along the joints and along the opposed edges respectively of adjoining disc sections and abutting face to face along juncture planes between sections.

3. A brake disc as described in claim 1, the joints between sections being ship-lap joints.

4. A brake disc as described in claim 1, the joints between sections being tongue and groove joints.

5. A brake disc as described in claim 1, the face of the disc confronting the car wheel in mounted position of the disc having a series of heat radiating fins.

6. A wheel and brake disc unit for a railway car truck, comprising a car wheel with a hub, a brake disc on the inboard side of the car wheel having a hub rigidly and removably connected to the hub of the car wheel, the part of the disc radially beyond said hubs being axially spaced from the car wheel, said disc comprising a series of complemental, duplicate and interchangeable sections jointed and removably secured together into a single disc unit, said disc sections being substantially in the form of sectors with substantially radial edges, said sections being jointed together edge to edge and conjointly presenting on its inboard face a continuous flat annular friction brake surface, the adjoining portions along each joint overlappig across the regions of said friction brake surface to cause one of the sections along each joint to support the other adjoining section along the latter joint against braking pressure applied to said brake surface, said disc being free from any means of support or any means of interconnecting the sections of the disc except that provided by the hub of the car wheel and that provided by the overlapping portions of the disc section along their joints.

References Cited in the file of this patent

UNITED STATES PATENTS

| | | |
|---|---|---|
| 340,580 | Huber | Apr. 27, 1886 |
| 1,604,852 | Powell | Oct. 26, 1926 |
| 2,153,280 | Shelor | Apr. 4, 1939 |
| 2,174,409 | McCune | Sept. 26, 1939 |
| 2,198,027 | Farmer | Apr. 23, 1940 |
| 2,237,624 | Oldham | Apr. 8, 1941 |
| 2,351,573 | Ledwinka | June 13, 1944 |
| 2,587,047 | Kelly | Feb. 26, 1952 |
| 2,610,719 | Hornbostel | Sept. 16, 1952 |
| 2,621,762 | Bachman | Dec. 16, 1952 |

FOREIGN PATENTS

| | | |
|---|---|---|
| 507,206 | Belgium | Dec. 15, 1951 |